United States Patent [19]

Elkins et al.

[11] 4,375,127
[45] Mar. 1, 1983

[54] METHOD OF ASSEMBLING AND SEALING AN ALKALI METAL BATTERY

[75] Inventors: Perry E. Elkins; Jerry E. Bell, both of Santa Ana; Richard A. Harlow, Newport Beach; Gordon G. Chase, San Diego, all of Calif.

[73] Assignee: Ford Motor Company, Dearborn, Mich.

[21] Appl. No.: 184,586

[22] Filed: Sep. 5, 1980

[51] Int. Cl.³ .................. H01M 10/39; H01M 2/08; H01M 10/38
[52] U.S. Cl. ................................ 29/623.5; 29/623.2
[58] Field of Search ............... 29/623.2, 623.5, 623.1; 427/58, 344; 429/101, 102, 104, 171, 172, 173, 174, 185

[56] References Cited

U.S. PATENT DOCUMENTS

| | | | |
|---|---|---|---|
| 1,711,739 | 5/1929 | Marsal | 29/623.5 |
| 3,756,856 | 9/1973 | Tennenhouse | 429/104 |
| 4,037,027 | 7/1977 | Desplanches et al. | 29/623.2 |
| 4,170,694 | 10/1979 | Chase et al. | 429/104 X |

Primary Examiner—Francis S. Husar
Assistant Examiner—Jonathan L. Scherer
Attorney, Agent, or Firm—William E. Johnson; Olin B. Johnson

[57] ABSTRACT

A method of initially assembling and then subsequently hermetically sealing a container portion of an alkali metal battery to a ceramic portion of such a battery is disclosed. Sealing surfaces are formed respectively on a container portion and a ceramic portion of an alkali metal battery. These sealing surfaces are brought into juxtaposition and a material is interposed therebetween. This interposed material is one which will diffuse into sealing relationship with both the container portion and the ceramic portion of the alkali metal battery at operational temperatures of such a battery. A pressure is applied between these sealing surfaces to cause the interposed material to be brought into intimate physical contact with such juxtaposed surfaces. A temporary sealing material which will provide a seal against a flow of alkali metal battery reactants therethrough at room temperatures and is applied over the juxtaposed sealing surfaces and material interposed therebetween. The entire assembly is heated to an operational temperature so that the interposed material diffuses into the container portion and the ceramic portion to form a hermetic seal therebetween. The pressure applied to the juxtaposed sealing surfaces is maintained in order to ensure the continuation of the hermetic seal.

8 Claims, 4 Drawing Figures

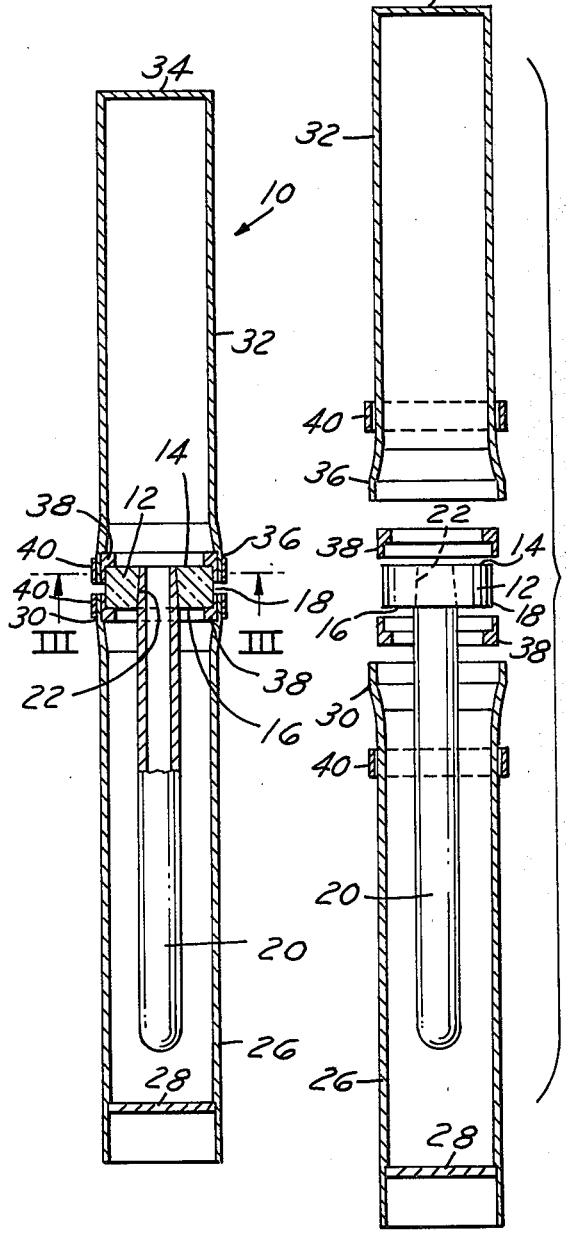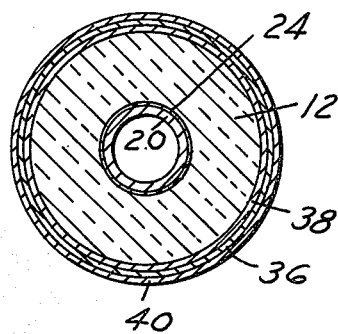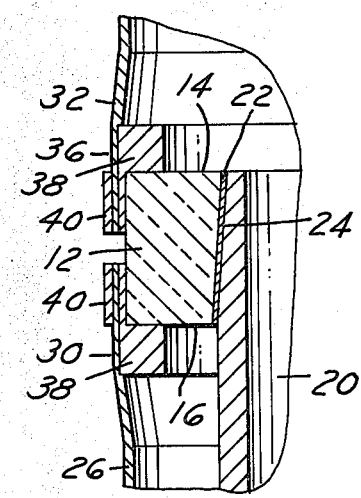

METHOD OF ASSEMBLING AND SEALING AN ALKALI METAL BATTERY

The invention herein described was made in the course of or under a contract or subcontract with the Department of Energy (Contract #DE-AMO2-79-CH10012)

BACKGROUND OF THE INVENTION AND PRIOR ART STATEMENT

In recent years there has been a great deal of work done in the field of alkali metal batteries. In particular, the work has been concentrated on the development of commercially acceptable sodium sulfur batteries for uses such as load leveling in commercial power generation plants. By load leveling it is meant that, during times of slack demand, the sodium sulfur batteries are charged by the generation equipment. In periods of high demand, the power demands are supplied not only by full utilization of the generating equipment of the plant, but also by means of discharging of the sodium sulfur batteries which were charged during off-load times.

Generally, the sodium sulfur load leveling batteries under operation conditions will work at a temperature of about 350° C. The chemical elements making up the two reactants of the battery, namely, sodium and sulfur, can be extremely corrosive and, if directly mixed with one another, can produce a reaction which generates a substantial amount of heat that may be detrimental to the load leveling battery system. It is therefore very desirable to seal the reactants of such batteries securely within their containers so that they are not able to leak during operation. By preventing such leakage, corrosive attack on the battery components as well as a possible unfavorable interaction between such reactants is avoided.

It is a principal object of this invention to provide a method of initially assembling and subsequently hermetically sealing a container portion of the alkali metal battery to a ceramic portion of that battery. The method is accomplished in a expeditious manner and it provides a hermetic seal between a container portion of an alkali metal battery and a ceramic portion of such a battery which ensures that the reactant materials confined within the container will not seap through the sealed area.

The closest prior art of which we are aware is U.S. Pat. No. 4,170,694 which issued on Oct. 9, 1979 for a "Hermetically Sealed Alkali Metal Battery Container." This patent discloses a hermetically sealed alkali metal battery container which includes a ceramic ring having upper and lower contoured surfaces located on its outer circumferential surface. The battery also includes outer metal casings defining an upper battery container and a lower battery container formed so as to have a bell-shaped open end on each one. The bell-shaped open end of the respective casings are located adjacent the contoured surfaces formed on the ceramic ring. Each bell-shaped open end of a metal casing has associated therewith a sealing band which engages the open end of the casing to compress the same into engagement with an associated contoured surface of the ceramic ring to form a hermetic seal therebetween.

While the structure shown in U.S. Pat. No. 4,170,694 looks somewhat like the structure to be disclosed in this specification, the method of assembling that structure is totally distinct and different from the method specifically disclosed in this application for providing a hermetic seal between container portions of an alkali metal battery and a ceramic portion of that same battery. This total difference in the methods disclosed in the mentioned patent and in the specification following will be readily apparent after one has reviewed this specification in detail.

For the sake of full disclosure, the applicants wish to indicate that the particular patents mentioned in the Background of the Invention and Prior Art Statement portion of the mentioned U.S. Pat. No. 4,170,694 are in no way relevent to the particular method disclosed and claimed in this application. Therefore, no discussion of those patents is presented herein.

SUMMARY OF THE INVENTION

This invention is directed to a method for forming a structure for containing an alkali metal battery and, more particularly, to a method of initially assembling and then subsequently hermetically sealing a container portion of an alkali metal battery to a ceramic portion of an alkali metal battery.

In accordance with the general principles of this invention, a method of initially assembling and then subsequently hermetically sealing a container portion of an alkali metal battery to a ceramic portion of such a battery has the following general steps. A sealing surface is formed on the container portion of the alkali metal battery. A sealing surface is also formed on the ceramic portion of the alkali metal battery. The sealing surface of the container portion of the alkali metal battery is brought into juxtaposition with the sealing surface of the ceramic portion of the alkali metal battery. A material is interposed between the juxtaposed sealing surfaces. The interposed material is one which at operational temperatures of the alkali metal battery will diffuse into sealing relationship with the container portion and the ceramic portion of the alkali metal battery. A temporary sealing material is applied over the juxtaposed sealing surfaces and the material interposed therebetween. This sealing material is one which (a) at room temperatures will provide a seal against a flow of alkali metal battery reactants therethrough, and (b) at operational temperatures of such an alkali metal battery will degrade to form electrically nonconductive products. A pressure is applied between the juxtaposed sealing surfaces to cause the material interposed between such sealing surfaces to be brought into intimate physical contact with the juxtaposed sealing surfaces. The sealing surfaces, the interposed material and the temporary sealing material are heated to an operational temperature for an alkali metal battery. In view of such heating, the interposed material diffuses into the juxtaposed surfaces to form a hermetic seal therebetween, and the temporary sealing material degrades to form electrically nonconductive products. The pressure applied between the juxtaposed sealing surfaces is maintained so that the hermetic seal which has been formed between such juxtaposed sealing surfaces by the interposed material remains in proper sealing relationship during operation of the alkali metal battery.

In accordance with further embodiments of the method of this invention, the sealing surface formed on the container portion of the alkali metal battery is an inwardly facing ring shaped surface having a first diameter and the sealing surface of the ceramic portion of the alkali metal battery is an outwardly facing ring shaped surface having a second diameter that is slightly less than the first diameter of the inwardly facing ring shaped surface.

While, in accordance with an embodiment of this invention, the method for forming a hermetic seal may be applied to seal only one container of the alkali metal battery while a different type of seal is used to seal the other container, in the preferred embodiment of this invention, it is desired that the method be employed to form the seals on both containers of such an alkali metal battery at the same time.

BRIEF DESCRIPTION OF THE DRAWINGS

The novel features that are considered characteristic of the method of this invention are set forth with particularlity in the appended claims. The invention itself, however, both as to its organization and its method of operation, together with additional objects and advantages thereof, will best be understood from the following description of specific embodiments when read in conjunction with the accompanying drawing wherein reference characters indicate like parts throughout the several figures, and in which:

FIG. 1 is an elevational view, partly in cross-section, showing a hermetically sealed alkali metal battery container formed in accordance with the method of this invention in a fully assembled condition;

FIG. 2 is a view similar to FIG. 1 showing the container in a disassembled condition;

FIG. 3 is a cross-sectional view taken line III—III of FIG. 1 to show in detail the hermetic seal formed by the method of this invention; and FIG. 4 is an enlarged view, in elevation, showing details of the seal formed by the method of this invention.

DESCRIPTION OF THE PREFERRED EMBODIMENT

This invention is directed to a method of initially assembling and then subsequently hermetically sealing a container portion of an alkali metal battery to a ceramic portion of an alkali metal battery. Alkali metal batteries to which this invention pertains are well known in the art. Many patents have issued on various aspects of alkali metal battery construction. This particular specification is directed to a method for providing a hermetic seal for a reactant container for such a battery. In normal battery operation, two reactant containers are required. Therefore, the preferred embodiment of this specification will be directed to a method of assembling two such containers for an alkali metal battery and for subsequently hermetically sealing both of the container portions to a ceramic portion of that alkali metal battery.

A hermetic seal for an alkali metal battery is described in U.S. Pat. No. 4,170,694, previously noted. This patent details a basic concept of radial compression ring seal for forming such a hermetic seal. The sealing assembly disclosed in this patent is accomplished by a sliding of high strength steel rings over ends of opposed reactant containers so as to exert a radial force on the container end to make a hermetic seal with a contoured ceramic material also forming a portion of the alkali metal battery structure. The contour formed on the ceramic as set forth in the U.S. Pat. No. 4,170,694 provides a circumferential line of contact that results in a sufficiently high sealing pressure to effect a hermetic seal.

The material set forth in the U.S. Pat. No. 4,170,694 does have some practical commercial limitations when applied to the manufacture of a plurality of cells. A first limitation is the difficulty in machining the ceramic portions of the cell to form the required contoured surfaces. This machining is expensive and is an added cost for such alkali metal battery.

A second limitation is that the stress required to to obtain a good seal is transmitted through the ceramic material to a glass seal which is also formed between that ceramic insulator and a beta alumina electrolyte. Sometimes this high stress that is placed on the glass can cause the glass seal to fracture.

In order to eliminate these problems, the now to be disclosed method of initially assembling and then hermetically sealing container portions of an alkali metal battery to a ceramic portion thereof was developed. The method of this invention will best be understood by referring to the detailed discussion contained hereinbelow.

In FIGS. 1 and 2, there is seen an alkali metal battery generally designated by the numeral 10. This battery includes a ceramic ring 12 which has a top surface 14 and a bottom surface 16. The ceramic ring also has an outer circumferential surface 18 of uniform diameter. As is well known in the art, the ceramic ring is formed from a material such as alpha aluminum of high purity, for example, 99.8%.

An inner casing 20 of a solid alkali ion conductive material is in the form of a closed end tube. This casing is used as a reaction zone separator and is made from a material which will permit the transfer of ions of anodic reactant therethrough to a cathodic reactant. The construction of such a structure is well known in the art, and one material which is useful is a beta-type alumina or sodium beta-type alumina. This inner casing is bonded near its open end within and to an interior surface 22 of the ceramic ring 12 by means of a glass seal 24, shown best in FIG. 4, so that the inner casing extends downwardly from the botton surface 16 of the ceramic ring.

A first outer metal casing 26 with a closed end 28 and an open end 30, best seen in FIG. 2, is also provided. This casing surrounds the inner casing 20 and is spaced therefrom. This outer metal casing is made from a metal such as 446 stainless steel.

The open end 30 of the first outer casing 26 has a diameter slightly greater than the diameter of the outer circumferential surface 18 of the ceramic ring 12. The open end 30 is brought into a position encircling a lower portion of the outer circumferential surface of the ceramic ring and, as is best seen in FIGS. 1 and 4, is hermetically sealed thereto in accordance with the method to be described hereinbelow. In a like manner, a second outer casing 32 is provided which has a closed end 34 and an open end 36.

The method of initially assembling and then subsequently hermetically sealing the first outer metal casing 26 and the second outer metal casing 32 to the ceramic ring of the alkali metal battery 10 will now be described in detail.

The interior surface of the open end 30 of the first metal casing 26 as well as the interior surface of the open end 36 of the second outer casing 32 each form a sealing surface. The outer circumferential surface 18 of the ceramic ring 12 forms a sealing surface on the ceramic ring against which both the first metal casing 26 and the second outer casing 32 can be sealed.

In order to form the seals, the open end 30 of the first metal casing 26 is brought into juxtaposition with the lower portion of the outer circumferential surface 18 of the ceramic ring 12. In a similar manner, the open end 36 of the second outer casing 32 is brought into juxtaposition with an upper portion of the outer circumferential surface 18 of the ceramic ring 12.

In accordance with the teachings of the method of this invention, a material 38—38 is interposed between the juxtaposed sealing surfaces. This material is one which at operational temperatures of the alkali metal battery 10 will diffuse into sealing relationship with the metal casings 26 or 32 and the ceramic ring 12. A metal which we have found is useful in such an application is aluminum.

A pressure is applied between the juxtaposed sealing surfaces, that is, between the open ends 30 and 36 of the first outer metal casing 26 and second outer casing 32, respectively, and the outer circumferential surface 18 of the ceramic ring 12, to cause the interposed material 38 to be brought into intimate physical contact with the juxtaposed sealing surfaces. In accordance with the teachings of the preferred embodiment, this pressure is applied by means of sealing bands 40—40. These sealings bands are preferably made from a metal such as steel. The sealing bands are pulled up over the open end 30 of the first metal casing 26 and down over the open end 36 of the second outer casing 32 in order to form a temporary seal between the elements as aforedescribed. This sealing action is readily understood, especially in view of the teachings of U.S. Pat. No. 4,170,694.

After this initial sealing action has taken place, a temporary sealing material is applied over the juxtaposed sealing surfaces and material interposed therebetween. Since this temporary sealing material is subsequently degraded, it is not shown as an element in the drawing. However, reference is made to FIG. 4. In this figure, the temporary sealing material would be a material which would be one that would be applied over both the interior sealed area and the exterior sealed area. A light coating of this material would be much like a coating of paint on a wall. A material suitable for this purpose is silicone elastomeric coating. The requirements for such a sealing material are that it be one which (a) at room temperatures will provide a seal against a flow of alkali metal battery reactants therethrough, and (b) at operational temperatures of such an alkali metal battery will degrade to form electrically nonconductive products. In essence, this material acts as a seal for battery reactants from room temperature up to and for a period of time at normal operational temperatures. However, after the battery has been subjected to normal operational temperatures for a period of time, the sealant material no longer seals the container. The resultant byproducts of the sealant material must be nonconductive so they will not short out the battery. The previously mentioned silicone elastomeric coating is a product which has the required characteristics.

Prior to heating the alkali metal battery to an operational temperature, the battery components must be introduced into their containers. The first outer metal casing 26, for example, may contain sulfur, while the second outer metal casing 32 may contain sodium in the case where the alkali metal battery is a sodium sulfur battery. Introduction of the reactant materials into their respective containers is accomplished in a manner well known in the art. Therefore, no detailed discussion of this step will be undertaken herein. In the appended claims, this particular step of filling the containers is not recited because it is not pertinent to the process for developing the hermetic seals taught in this application. However, it is implicit that in normal practice, the various containers of the battery are filled with the required reactant materials prior to the alkali metal battery being heated to an operational temperature.

As is well known in the art, sodium sulfur alkali metal batteries operate generally at a temperature in the range from 300° C. to 350° C. Therefore, in accordance with the teachings of the method of this invention, once the battery reactants have been placed in their containers, the entire battery assembly is heated to a temperature of about 350° C. This means that the open ends 30 and 36, respectively, of the first outer metal casing 26 and the second outer metal casing 32, as well as the ceramic ring 12 and interposed material 38, in addition to the temporary sealing material, are all heated to the stated temperature. As the entire alkali metal battery 10 is heated to the operational temperature, and for a period of time at such temperature, the interposed material diffuses into the juxtaposed surfaces formed between the open ends of the casings and the outer circumferential surface 18 of the ceramic ring 12. The material diffuses into both the metal container and into the ceramic material to form a hermetic seal therebetween. Also, during this period of time, the temporary material which provided a seal against the reactant materials at a lower temperature will degrade to form electrically nonconductive products which no longer seal the battery. In such a manner, the temporary sealed container is converted into a hermetically sealed container; the seal being developed because of the heating of the entire alkali metal battery.

The pressure applied by the sealing bands 40—40 on the respective open end 30 of the first metal casing 26 and the open end 36 of the second outer casing 32 is maintained. This action ensures that the hermetic seal which has been formed between the various elements remains intact during operation of the alkali metal battery. In the preferred embodiment of the method disclosed herein, the outer circumferential surface 18 of the ceramic ring 12 is of a second diameter slightly smaller than the diameter of the inwardly facing surface of the open ends of the outer casings.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of initially assembling and then subsequently hermetically sealing a container portion of an alkali metal battery to a ceramic portion of an alkali metal battery which comprises:

forming a sealing surface on the container portion of the alkali metal battery;

forming a sealing surface on the ceramic portion of the alkali metal battery;

bringing said sealing surface of the container portion of the alkali metal battery in juxtaposition with said sealing surface of the ceramic portion of the alkali metal battery;

interposing between said juxtaposed sealing surfaces a material which at operational temperatures of the alkali metal battery will diffuse into sealing relationship with the container portion and the ceramic portion of the alkali metal battery;

applying a pressure between said juxtaposed sealing surfaces to cause said interposed material to be brought into intimate physical contact with said juxtaposed sealing surfaces;

applying a temporary sealing material over said juxtaposed sealing surfaces and said material interposed therebetween, said sealing material being one which (a) at room temperature will provide a seal against a flow of alkali metal battery reactants therethrough, and (b) at operational temperatures of such an alkali metal battery will degrade to form electrically nonconductive products;

heating said sealing surfaces, said interposed material and said temporary sealing material to an operational temperature for an alkali metal battery whereby said interposed material diffuses into said juxtaposed surface to form a hermetic seal therebetween and said temporary sealing material degrades to form electrically nonconductive products; and maintaining said applied pressure between said juxtaposed sealing surfaces to maintain said hermetic seal which has been formed therebetween by said interposed material.

2. The method of claim 1 wherein: said sealing surface formed on the container portion of the alkali metal battery is an inwardly facing ring shaped surface having a first diameter, and wherein said sealing surface of the ceramic portion of the alkali metal battery is an outwardly facing ring-shaped surface having a second diameter slightly less than said first diameter of said inwardly facing ring shaped surface.

3. The method of claim 2 wherein: said pressure is maintained between said juxtaposed sealing surfaces by drawing a sealing band into pressure applying contact with the container portion of the alkali metal battery having said inwardly facing ring shaped surface thereon.

4. The method of claims 1, 2 or 3 wherein: said material interposed between said juxtaposed sealing surfaces is aluminum.

5. A method of initially assembling and then subsequently hermetically sealing two container portions of an alkali metal battery to a ceramic portion of an alkali metal battery which comprises:

forming a sealing surface on each of the two container portions of the alkali metal battery;

forming two separate and spaced apart sealing surfaces on the ceramic portion of the alkali metal battery;

bringing said sealing surface of one of the container portions of the alkali metal battery in juxtaposition with one of said sealing surfaces of the ceramic portion of the alkali metal battery;

bringing said sealing surface on the second of the container portions of the alkali metal battery in juxtaposition with the other of said sealing surfaces of the ceramic portion of the alkali metal battery;

interposing between each of said juxtaposed sealing surfaces a material which at operational temperatures of the alkali metal battery will diffuse into sealing relationship with the container portion and the ceramic portion of the alkali metal battery;

applying a pressure between said juxtaposed sealing surfaces to cause said interposed material to be brought into intimate physical contact with said juxtaposed sealing surfaces;

applying a temporary sealing material over said juxtaposed sealing surfaces and said material interposed therebetween, said sealing material being one which (a) at room temperature will provide a seal against a flow of alkali metal battery reactants therethrough, and (b) at operational temperatures of such an alkali metal battery will degrade to form electrically nonconductive products;

heating said sealing surfaces, said interposed material and said temporary sealing material to an operational temperature for an alkali metal battery whereby said interposed material diffuses into said juxtaposed surface to form a hermetic seal therebetween and said temporary sealing material degrades to form electrically nonconductive products; and maintaining said applied pressure between said juxtaposed sealing surfaces to maintain said hermetic seal which has been formed therebetween by said interposed material.

6. The method of claim 5 wherein: said sealing surface formed on each of the two container portions of the alkali metal battery is an inwardly facing ring shaped surface having a first diameter and wherein said two sealing surfaces formed on the ceramic portion of the alkali metal battery are outwardly facing ring shaped surfaces having a second diameter slightly less than said first diameter of said inwardly facing ring shaped surface.

7. The method of claim 6 wherein: said pressure is maintained between said juxtaposed sealing surfaces by drawing sealing bands into pressure applying contact with each of the container portions of the alkali metal battery having said inwardly facing ring shaped surfaces formed thereon.

8. The method of claims 5, 6 or 7 wherein: said material interposed between said juxtaposed sealing surfaces is aluminum.

* * * * *